(12) United States Patent
Richter et al.

(10) Patent No.: US 7,939,754 B2
(45) Date of Patent: May 10, 2011

(54) CONNECTION BOX FOR SOLAR PANEL

(75) Inventors: Michael Richter, Schalksmuehle (DE); Stefan Joergens, Schalksmuehle (DE); Ralf Schuler, Luedenscheid (DE); Andreas Ross, Luedenscheid (DE)

(73) Assignee: Lumberg Connect GmbH, Schalksmuehle (DE)

( * ) Notice: Subject to any disclaimer, the term of this patent is extended or adjusted under 35 U.S.C. 154(b) by 192 days.

(21) Appl. No.: 12/434,735

(22) Filed: May 4, 2009

(65) Prior Publication Data

US 2009/0272573 A1   Nov. 5, 2009

(30) Foreign Application Priority Data

May 3, 2008 (DE) .......................... 10 2008 022 052

(51) Int. Cl.
*H02G 3/08* (2006.01)
(52) U.S. Cl. .............. 174/50; 174/58; 174/64; 136/244; 439/142; 439/718
(58) Field of Classification Search .............. 174/50, 174/58, 64, 535; 136/244, 245, 246, 251; 439/135, 136, 142, 571, 786, 796, 718
See application file for complete search history.

(56) References Cited

U.S. PATENT DOCUMENTS

| 4,460,232 A | * | 7/1984 | Sotolongo | 439/535 |
| 5,125,608 A | * | 6/1992 | McMaster et al. | 248/163.1 |
| 7,763,807 B2 | * | 7/2010 | Richter | 174/138 F |

FOREIGN PATENT DOCUMENTS

| DE | 2245500 | 4/1974 |
| DE | 2256105 | 6/1974 |
| DE | 8422774 | 10/1984 |
| DE | 19600546 | 7/1997 |
| DE | 10121890 | 11/2002 |
| DE | 102005927771 | 11/2006 |

* cited by examiner

*Primary Examiner* — Dhiru R Patel
(74) *Attorney, Agent, or Firm* — Andrew Wilford

(57) ABSTRACT

A box for connecting an output conductor of a solar panel with a feed cable has a base mountable on the solar panel and having a generally planar floor from whose outer periphery a side wall projects perpendicularly. A cover engageable with the side wall forms with the floor and side wall a substantially closed compartment. At least one holder in the compartment on the floor grips and positions an end of the feed cable such that it extends in a predetermined first direction. The side wall is formed with a cutout through which the feed cable passes. The cutout and holder are relatively spaced and oriented such that the cable extends in a predetermined second direction that forms an acute angle with the first direction between the holder and the cutout.

6 Claims, 3 Drawing Sheets

CONNECTION BOX FOR SOLAR PANEL

FIELD OF THE INVENTION

The present invention relates to a connection box. More particularly this invention concerns a connection box for a solar panel.

BACKGROUND OF THE INVENTION

A connection box for a solar panel typically has a base that is mounted directly on the panel and has a floor and a wall defining with a removable cover a compartment. A panel-output conductor or line enters the compartment normally through a hole in the floor and a feed cable that goes to the user or network getting the electricity generated by the solar panel passes out through a hole in the wall of the base, where a strain relief is typically provided for this fable.

A connection box of this type is known from DE 8,422, 774, in which the feed cable is set in a groove in the floor of the box and clamped down by a screw-on strap to relieve strain.

It is known on the one hand to provide the side wall of the base, which delimits the compartment, with threaded sleeves having crimp tongues. After the feed cable is routed through the threaded sleeve and the wall cutout into the compartment, a cap nut is screwed onto the threaded sleeve to press the crimp tongues against the insulation sheath of the feed cable and thus holds to relieve on the connection box and cable.

Inserting cables for strain relief in a nonstraight channel is also known, which is not possible with the feed cables for solar panels because of their rigidity, however.

The above-described prior art has two disadvantages. On the one hand, separate work steps that are difficult to automate are necessary for the strain-relieving fixing of the feed cable, on the other hand, the strain-relief arrangements are separate components. In view of the rising cost pressure in the manufacturing of the connection boxes of this type, improvements in this regard are to be developed.

Another known solution is a contact crimped on the end of the feed cable and having a part of the strain-relief assembly. The contact is fastened using an insulation crimp ring on the feed cable. The section of the feed cable provided with the insulation crimp ring is inserted in a holding seat formed in the base of the connection box, to relieve strain. This strain-relief arrangement is generally satisfactory but does not meet an American testing norm for strain relief testing, for example. Specifically, thins text requires that the contact for connection to the connection box of the panel-output conductor cannot be a component of the strain-relief arrangement. As a result, according to the testing specification, the feed cable is cut the contact and the strain-relief testing is then performed. Since the insulation crimp ring is a component of the contact, this procedure greatly weakens the assembly and ensures failure of the test.

OBJECTS OF THE INVENTION

It is therefore an object of the present invention to provide an improved solar-panel connection box.

Another object is the provision of such an improved solar-panel connection box that overcomes the above-given disadvantages, in particular that has an effective strain relief, but also meets requirements for cost-effective and automated manufacturing and, passes the described strain-release test.

SUMMARY OF THE INVENTION

A box for connecting an output conductor of a solar panel with a feed cable has according to the invention a base mountable on the solar panel and having a generally planar floor from whose outer periphery a side wall projects perpendicularly. A cover engageable with the side wall forms with the floor and side wall a substantially closed compartment. At least one holder in the compartment on the floor grips and positions an end of the feed cable such that it extends in a predetermined first direction. The side wall is formed with a cutout through which the feed cable passes. The cutout and holder are relatively spaced and oriented such that the cable extends in a predetermined second direction that forms an acute angle with the first direction between the holder and the cutout.

By routing the feed cable at a specific angle so that it is in effect kinked in the compartment, the traction forces is resolved into two force components. One force component acts in the traction direction and the other orthogonally to the traction direction. Effective strain relief of the feed cable may thus be achieved in an extremely simple way without additional components.

An embodiment in which the angle is greater than 10° and less than 80°, in particular greater than 20° and less than 70°, in particular greater than 30° and less than 60°, in particular 45°, is especially preferable.

Because of the favorable breaking down into two force components which are identical an absolute value, guiding of the feed cable inside the connection box at an angle of 45° is especially preferred.

The guiding of the feed cable at an angle inside the connection box is implemented in particular in that the wall cutout is disposed offset in the wall in relation to the contact region and parallel to the planar floor of the base.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
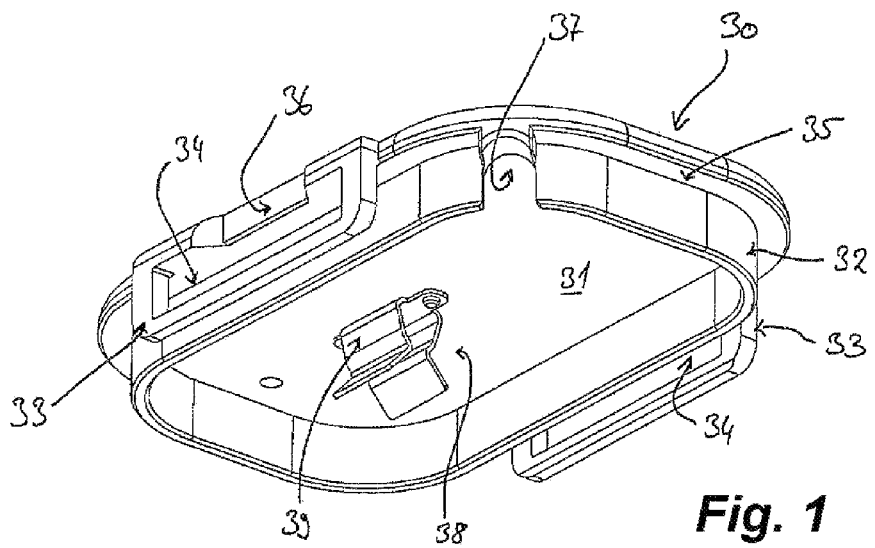
FIG. 1 is a bottom perspective view of a cover of a box according to the invention.
Figure 2:
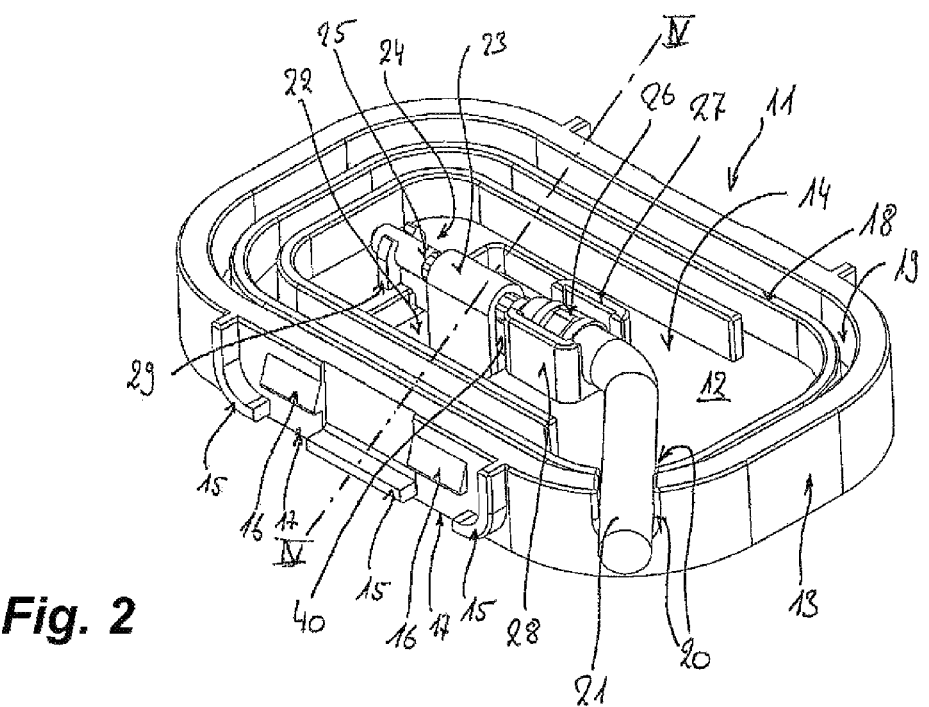
FIG. 2 is a top perspective view of the base of the box.

As seen in the drawing a connection box according to the invention basically comprises a base 11 and a cover 30. The base 11 (FIG. 2) has a generally rectangular and planar floor 12 from whose outer periphery an upwardly projecting, annular, and relative thick outer side wall 13 projects. A thinner inner side wall 18 inside the outer wall 13 forms with it an upwardly open annular gap 19. The floor 12, walls 13 and 18, and cover 30 together define a compartment 14 in which the connection is made between a conductor 23 coming from a solar panel indicated in FIG. 4 at 55 and entering via a hole 22 in the floor 12 and a feed cable 21 extending out through matching notches or cutouts 20 in the walls 13 and 18. The panel-output conductor 23 is a standard ribbon conductor and the feed cable 21 a standard wire with a single- or multistrand conductive core surrounded by an insulating sheath. (The references to "up" and "down" being purely for convenience of description, since the box is often mounted inverted on the generally downwardly facing back face of the solar panel 55.)

The side wall 13 is provided on two opposing sides on its outer surface with lug guides 15 and locking lugs 16. The lug guides 15 have tool-engagement formations 17 below the locking lugs 16.

The feed cable 21 has a stripped end 24 where the strand conductors of the wire are mechanically stiffened using a wire end sleeve 25. A crimp ring 26 downstream in the end 24 is used as the cable strain relief. The floor 12 of the connection box 10 has two approximately U-shaped ridges 27 projecting perpendicularly up from the floor 12. The ridges 27 form a holding slot 28 having an inwardly open groove. This groove is used for the strain-relieving insertion of the section of the feed cable 21 provided with the crimp ring 26.

The end 24 of the feed cable 21 provided with the wire end sleeve 25 spans the opening 22 of the floor 12 and is anchored at least on the other side of the opening 22 in the slot 28. To this end, two pins 29 provided in pairs on the floor 12 form a seat for the wire end sleeve 25. In the present case, the wire end sleeve 25 additionally rests on a support web 40 that bridges the opening 22. Thus the pins 29 form a holder for the end 24 on one side of the opening 22 and the ridges 27 form a holding slot 28 on the near side that also functions as a strain relief.

The panel-output conductor 23 coming from the solar panel enters through the opening 22 into the compartment 14 of the connection box 10 and passes over the end 24 of the feed cable 21, so it partially wraps around the wire end sleeve 25 to form a good electrical connection therewith.

The bottom side of the base 11 of the connection box 10 that faces away from the cover 30 is secured to the solar panel 55 (FIG. 4) and in particular secured by an adhesive 56 thereto. The opening 22 is provided in the region of a cutout of the outer panel shell, through which the panel-output conductors 23 are routed outward.

The cover 30 has a planar and generally rectangular top wall 31 that when the box is closed confronts and is parallel to the floor 12. A peripheral collar 32 projects downward from the outer periphery of the cover 30 and can fit complementarily in the gap 19. A slot 37 in the collar 32 corresponds to the holes 20 so that it can fit around the cable 21.

Locking lugs 33 each defining an opening 34 project downward from two opposite long edges of cover 30 toward the base 11. The cover 30 further has an outwardly projecting rim 35 coplanar with its top wall 31 that normally sits atop the wall 13 and that is formed with cutouts 36 that allow a tool to be engaged downward with the formation 33 to pry it out and off the formation 15 to allow the cover to be removed.

The bottom face of the cover top wall 31 directed toward the base 11 is provided with contacts 38 in the form of spring clips 39 of approximately Ω-section.

Upon closing of the box 10, i.e. when the cover 30 is put on the base 11, the cover-side collar 32 engages in the annular gap 19. A seal (not shown) is provided for the gas-tight seal of the connection box 10 on the lower edge of the collar 32 or the floor of the gap 19. The lug guides 15 accommodate the locking lugs 33, which are pushed over the wedge-shaped locking lugs 16 and engage behind them to lock the connection box 10 closed. The spring clips 39, which are provided corresponding to the overlap region of the panel-output conductor 23 and end 24 of the feed cable 21 on the cover wall 31, overlap the wire end sleeve 25 upon closing. The panel-output conductor 23 is held securely clamped on the wire end sleeve 25 in this way.

The tool formations 17 and 36 are used for the purpose of being able to disengage the locking connection between the locking lugs 33 and the locking lugs 16 by spreading the locking lugs 33 and being able to remove the cover from the base 11.

Figure 4:
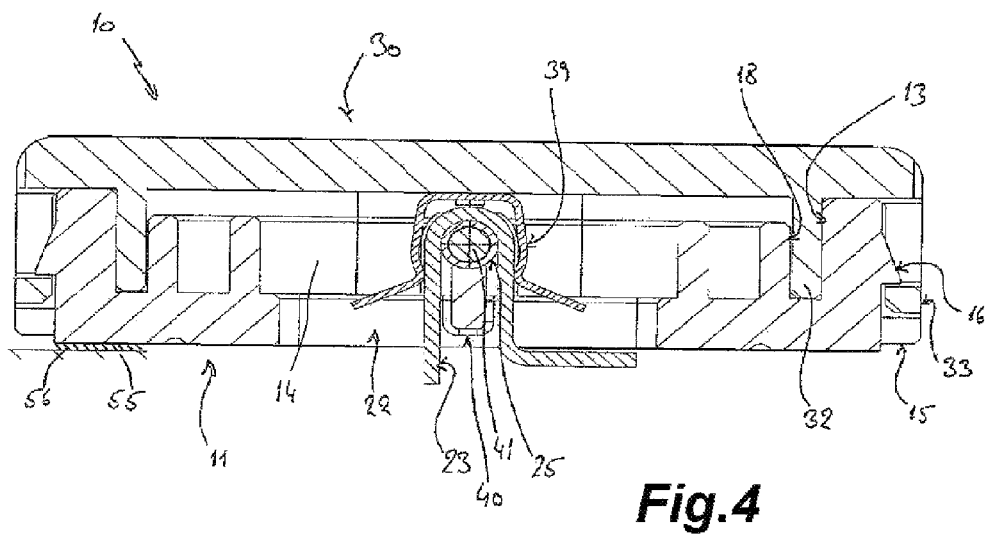
FIG. 4 is a section taken along line IV-IV of FIG. 2.

FIG. 4 shows the closed connection box 10. The locking connection between the cover 30 and the base 11 using the locking lugs 33 engaging behind the locking lugs 16 can be seen on the right. The collar 32 fits in the annular gap 19 formed between inner wall 18 and side wall 13. The wire end sleeve 25 wraps around most of the reinforced conductive core 41 of the feed cable 21, which is formed by a plurality of conductive strands so as to be mechanically stiffened. The panel-output conductor 23 originating from the solar panel passes over the end sleeve 25. The wire end sleeve 25 itself rests on a support web 40 around the conductive strands forming the core 41. The spring clip 39 grips around the panel-output conductor 23 and the wire end sleeve 25 and securely holds the panel-output conductor 23 in good electrical contact with the wire end sleeve 25.

It is obvious from FIG. 4 that only the wire end sleeve 25 is gripped by the spring clip 39. As a result, the spring clip 39, the panel-output conductor 23, and the wire end sleeve 25 form a self-supporting connector. However, even if a support web 40 formed unitarily with the floor and bridging the hole 22 between the holder slots 28 and pins 29 is provided for additional support for this connector, this would not cause further problems. Due to the so-called flowing of the plastic, i.e. when it permanently (plastically) deforms because of a continuously exerted pressure, the spring clip 39 would only close more solidly around the arrangement made of the panel-output conductor 23 and wire end sleeve 25, so that contact problems are prevented.

Of course, it is also possible within the scope of this invention for the contact 38 to be mounted on the panel-output conductor 23 and wire end sleeve 25 while detached from the cover 30.

In summary, the connecting box 10 according to the invention advantageously offers an easy-to-assemble, secure electrical connection between the panel-output conductor 23 and the feed cable 21. Tool-actuated conductor clamps and printed conductor structures inside the connection box are not needed. The simple arrangement of the panel-output conductor 23 directly on an electrically conductive region of the feed cable 21 and the secure connection using only one contact has significant time and cost advantages during the assembly of the connection box, in particular if the contact 38 is provided on the cover 30 of the box 10 and the connection between the panel-output conductor 23 and the feed cable 21 is secured automatically upon closing of the box 10.

Figure 3:
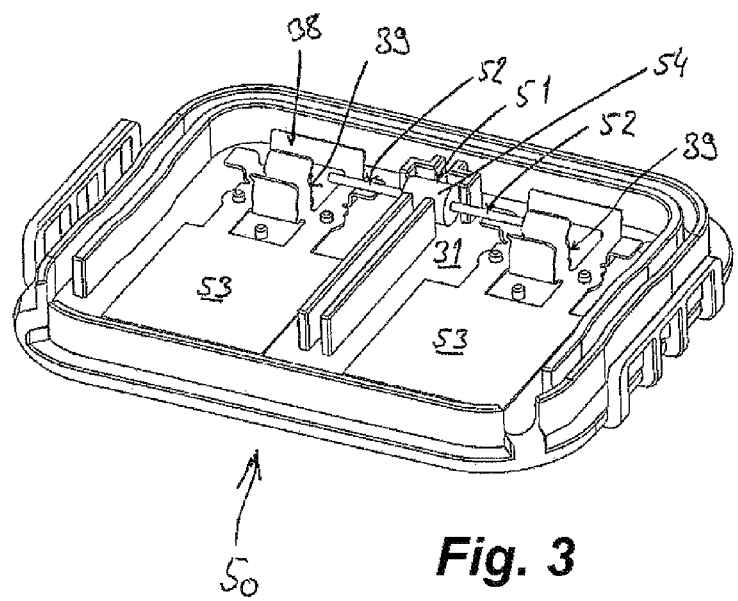
FIG. 3 is a perspective view of an alternative cover.

FIG. 3 shows a cover 50 of a further embodiment of the invention. The unillustrated connection box 10 of this second embodiment is of the multipolar type, that is for connecting a plurality of panel-output conductors 23 with two feed cables 21, here a two-pole connection box 10, in which a panel-output conductor 23 is wrapped around on each electrically conductive and mechanically stiffened end 24 of a feed cable 21, as described above. Two contacts 38 formed as spring clips 39 are provided in the cover 50 to connect the panel-output conductor 23 and the ends 24 of the feed cables 21.

In such multipolar connection boxes 10, the panel-output conductors 23 are typically provided with shunt diodes 51. These diodes prevent the heating of the solar panel if cells do not operate due to shade, for example, during parallel operation of a plurality of solar cells, in that undesired reverse current flow is prevented.

In contrast to the prior art, the shunt diodes are not mounted in the base via connection clamps, but rather are integrated in the cover 50 and are electrically connected to the spring clips 39 via their leads 52.

Because the shunt diodes 51 are the main producers of waste heat in the common applications, only the situation of the shunt diodes in the cover has significant advantages with respect to generation of heat. The diode is thus mounted directly on the cover wall 31 of the cover 50, which is usually well ventilated, so that the waste heat may be dissipated well. The dissipation of the heat may be significantly improved further if large cooling plates or at least one cooling plate 53 are mounted on the bottom face of the cover wall 31. These cooling plates or heat sinks are connected to the body 54 of the diode 51 via thermal bridges, the leads 52 in the present example, which further improves heat dissipation.

In a refinement, which is not shown here, the diode body 54 rests directly on the cooling plate 53, the diode body 54 then preferably having the largest possible contact surface.

If further circuit elements which produce heat are mounted inside the base of the connection box 10, they may be connected to the cooling plates 53 via spring tongues serving as thermal bridges.

In summary, FIG. 3 shows a decidedly advantageous refinement of the invention that can remedy problems due to waste heat generated circuit elements mounted inside the connection box 10.

Figure 5:
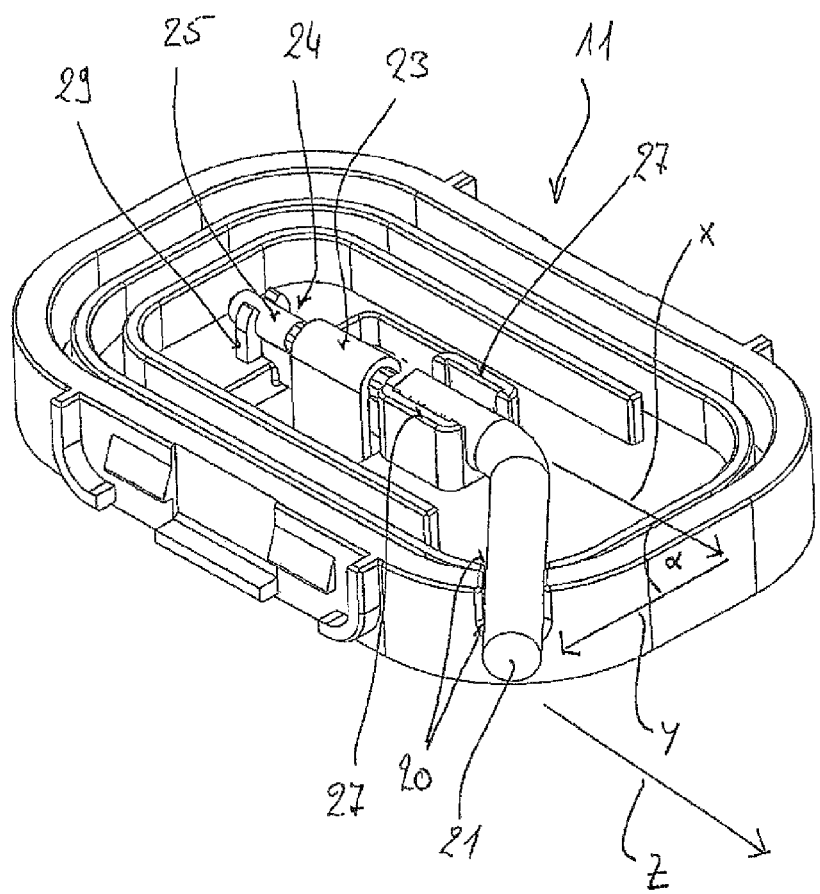
FIG. 5 is a view like FIG. 2 of an alternative base.

The novel strain relief according to the invention is shown in FIG. 5. Here the base 11 of the connection box 10 has a strain relief that does not use a crimp ring 26, but rather works by the routing of the feed cable 21 inside the base 11. The webs 27 only form the holding slot 28 here, which, in connection with the holder-forming pins 29 support the end 24 of the feed cable 21 over the hole 22. If one considers the above-cited US strain-relief test, the feed cable 21 would be cut inside the connection box 10 in the transition region from the insulation sheath to the stripped end 24. If one follows the feed cable 21 in the interior of the box, the cut therefore occurs directly outward of the webs 27. As a result, the cut feed cable 21 would remain in the holding slot 28 formed by the webs 27. The feed cable 21 thence runs at an angle toward a corner of the base 11 between the contact region 24, more precisely between the holding pins 29 and the wall cutouts 20 of side wall 13 and the inner wall 18. In the present example, the feed cable 21 forms an angle of 45° (not shown in greater detail in FIG. 5) to the wall sections adjacent the wall cutouts 20 to this end.

If a force having direction z is exerted on the feed cable 21 during the strain relief test, this force is decomposed into the force components x and y. The force components x and y are oriented orthogonally to one another. The resulting traction force acting on the contact region 24 is significantly decreased in this way. Adequate strain relief is thus ensured by the wedging action of the forces x and y.

No further components need be provided for this strain relief arrangement according to the invention except for the holder slots 28 and pins 29 for supporting the end 24 of the feed cable 21 used as the contact region, which are necessary in any case, and the wall cutouts 20, which are necessary in any case. Separate assembly steps are also not necessary.

In order to route the feed cable 21 out of the connection box 10 at an appropriate angle, it is only necessary to provide a nonaligned orientation of the wall cutouts 20 to the holding slot 28 and/or to the longitudinal extension of the contact region 24 of the feed cable 21. To this end, the wall cutouts 20 and 37 are provided offset in the inner wall 18 and side wall 13 in relation to the contact region 24 and plane-parallel to the floor 12 of the base 11, preferably in one of the corners of the connection box 10.

All those elements which have an influence on conducting power from the solar panel into the electricity network are referred to as circuit elements.

We claim:

1. A box for connecting an output conductor of a solar panel with a feed cable, the box comprising:
   a base mountable on the solar panel and having a generally planar floor from whose outer periphery a side wall projects perpendicularly;
   a cover engageable with the side wall to form with the floor and side wall a substantially closed compartment;
   at least one holder in the compartment on the floor adapted to grip and position an end of the feed cable such that it extends in a predetermined first direction, the side wall being formed with a cutout through which the feed cable passes, the cutout and holder being relatively oriented and spaced such that the cable extends in a predetermined second direction that forms an acute angle with the first direction between the holder and the cutout.

2. The connection box defined in claim 1 wherein the acute angle is greater than 10° and less than 80°.

3. The connection box defined in claim 1 wherein the acute angle is greater than 20° and less than 70°.

4. The connection box defined in claim 1 wherein the acute angle is greater than 30° and less than 60°.

5. The connection box defined in claim 1 wherein the acute angle is about 45°.

6. The connection box defined in claim 1 wherein the floor is generally rectangular and the first direction extends generally parallel to sides of the floor and the cutout is provided in a corner of the floor.

* * * * *